United States Patent Office

Re. 27,401
Reissued June 20, 1972

27,401

CROSS-LINKED HYDROPHILIC POLYMERS AND ARTICLES MADE THEREFROM

Otto Wichterle, Prague, and Drahoslav Lim, Senohraby, near Ricany, Czechoslovakia, assignors to Ceskoslovenska akademie ved, Prague, Czechoslovakia No Drawing. Original No. 3,220,960, dated Nov. 30, 1965, Ser. No. 77,278, Dec. 21, 1960, which is a division of Ser. No. 580,410 and Ser. No. 580,411, both Apr. 24, 1956. Application for reissue Aug. 5, 1970, Ser. No. 61,522

Int. Cl. C08f *15/16*

U.S. Cl. 260—2.5 R 23 Claims

Matter enclosed in heavy brackets [ ] appears in the original patent but forms no part of this reissue specification; matter printed in italics indicates the additions made by reissue.

*ABSTRACT OF THE DISCLOSURE*

*A major portion of a monoester of acrylic or methacrylic acid with a bi-functional alcohol which has an esterifiable hydroxyl group and at least one additional hydrophilic functional group is copolymerized in aqueous solution with a small amount of a diester of these acids and of an alcohol which has at least two esterifiable hydroxyl groups until a shape retaining body is obtained.*

This application is a division of our copending applications Ser. No. 580,410, now abandoned, and 580,411, now U.S. Patent No. 2,976,576, both applications having been filed on April 24, 1956.

This invention relates to a novel cross-linked hydrophilic polymer, to a hydrogel of which it is an essential constituent, and to articles made therefrom.

It has been known that copolymerization of a monomer having a polymerizable vinyl group, such as styrene, with a small amount of a monomer having two such groups, such as divinyl benzene, in organic solvent solution results in a gel formed by the cross-linked corresponding polymer and the solvent (see Staudinger and Heuer, Ber. 87, 1164, 1934; and French Patents No. 785,940 and 786,984). Corresponding hydrogels have hitherto not been prepared.

It has now been found that certain hydrogels essentially consisting of 20 to 97% of an aqueous liquid and a cross-linked hydrophilic polymer have desirable physical, optical, and physiological properties. The hydrogels of the invention retain a large percentage of water relative to the weight of their dry substance. In their hydrated condition they are elastically deformable under relatively small pressure but virtually immune to plastic deformation. They may be colorless or virtually colorless, and may be optically clear. They form semi-permeable membranes which permit passage of water and certain dissolved materials, but retain others. When the aqueous constituent of the hydrogels of the invention is of a composition similar or analogous to that of physiological saline solution, the hydrogels of a preferred type are compatible with body tissue for extended periods and may be employed for implants in the body separating tissue portions or for objects to be used in contact with mucous membranes, such as contact lenses or pessaries.

Because of their low modulus of elasticity, objects made from the hydrogels of the invention may be inserted into cavities in the body through narrow openings to fill the cavities. Bacteriostatic, bacteriocidal or otherwise medicinally active substances such as antibiotics may be dissolved in the aqueous constitutent of the hydrogels to provide medication over an extended period. The antibiotic or other medicinal substance gradually migrates into adjacent tissue by diffusion.

The hydrogels of the invention are produced by copolymerizing a hydrophilic monomer capable of forming a linear, or partly linear polymer in aqueous solution with a cross-linking agent in amounts small enough to yield an elastic, soft, transparent hydrogel. If the relative amounts of water and original monomer are such that the polymer may retain the water originally present as a hydrogel throughout the polymerization process, the product is mechanically and optically homogeneous, that is, fully transparent. If the polymer formed is incapable of combining with the entire amount of aqueous liquid present, the polymer separates from a solution phase during polymerization. There is obtained a microporous product.

Articles having unusual properties may be made from the hydrogel of the invention eiher by polymerizing a suitable mixture in a mold conforming to the desired object, or by first producing a body of polymeric material, and cutting or otherwise shaping it to produce a lens, a pessary, a dialyzer diaphragm, and other articles well known in themselves but acquiring new and useful properties when made from the hydrogel of the invention.

Preferred starting materials for producing the hydrogels of the invention include the esters of acrylic and methacrylic acid with alcohols having hydrophilic groups which after polymerization impart hydrophilic properties to the polymer obtained. A major portion of a monoester of acrylic or methacrylic acid with a bi-functional alcohol which has an esterifiable hydroxyl group and at least one additional hydrophilic functional group is copolymerized in aqueous solution with a small amount of a diester of these acids and of an alcohol which has at least two esterifiable hydroxyl groups until a shape retaining body is obtained. The diester preferably does not amount to more than one percent of the monoester so that the copolymer is only sparingly cross-linked.

The polyfunctional alcohols forming one of the constituent elements of the afore-mentioned monoester, and preferably also the alcohol constituent of the diester should have additional hydrophilic groups in their molecule which make the esters water soluble even after two or more of the hydroxyl groups are esterified by the acrylic or methacrylic acid.

Many derivatives of acrylic or methacrylic acid other than the esters mentioned are also suitable as monomers in the copolymerization reaction leading to the hydrogels of the invention. These include, but are not limited to the following monomers:

Dimethylaminoethyl methacrylate, piperidinoethyl methacrylate, morpholinoethyl methacrylate, methacrylylglycolic acid, methacrylic acid as such, the monomethacrylates of glycol, glycerol, and of other polyhydric alcohols, the monomethacrylates of dialkylene glycols and polyalkylene glycols. The corresponding acrylates may be substituted for the methacrylates.

Similarly, the diesters mentioned above may be replaced by other cross-linking agents of which the following are merely illustrative, it being understood that corresponding acrylic acid derivatives may be substituted for the methacrylic acid derivatives specifically enumerated:

Triethanolamine dimethacrylate, triethanolamine trimethacrylate, tartaric acid dimethacrylate, triethylene glycol dimethacrylate, the dimethacrylate of bis-hydroxyethylacetamide.

Other materials may be copolymerized to form the polymer skeleton of the hydrogels of the invention as will become apparent hereinafter.

Hydrogels having a broad range of unusual physical and chemical properties may be obtained by suitable selection of monomers, and particularly by the choice of suitable conditions of concentration in the aqueous solvent.

The mechanical properties and the ability of retaining water as a homogeneous constituent of the hydrogel are strongly influenced by the proportions of monofunctional monomer and polyfunctional cross-linking agent.

Hydrogels obtained from derivatives of acrylic and methacrylic acid are distinguished by excellent resistance to chemical attack. Their polymer constituent is not hydrolyzed by the water which is an integral constituent of the hydrogel but it also resists water at elevated temperatures and even at the boiling point so that objects made from the hydrogels of the invention can be repeatedly sterilized by boiling water, by boiling saline solutions, or steam without any deterioration. The hydrogels are also resistant to strong chemical agents such as hot fairly concentrated inorganic acids and bases. They are fully resistant to the action of microorganisms and are not attacked by enzymes. Many of them, and particularly those based on esters of acrylic or methacrylic acid may be stored for long periods in dilute aqueous hydrogen peroxide without chemical attack.

This chemical inertness together with colloidal properties which can be very closely assimilated to those of living tissue, as will become apparent hereinafter, make the hydrogels of the invention and objects made therefrom eminently suitable for the purposes of surgery, and particularly for prolonged contact with body tissues such as mucous membranes. Their selective permeability to water makes them suitable for applications in which they serve as membranes for dialysis. The permeability varies with the amount of cross-linking agent present and diaphragms made from the hydrogels of the invention may be adapted to special requirements. Where the diaphragm is part of an apparatus containing other elements, it may be prepared by polymerization in situ to form an integral part of a device. Because of their chemical inertness, diaphragms of the invention may be employed in many electrolytic processes to separate anolytes from catholytes.

To obtain a diaphragm of large effective area, a hydrogel of the invention may be formed with a large number of parallel channels or conduits which are separated by a comparatively thin layer of the polymeric hydrogel. The liquids, constituents of which are to be exchanged by dialysis, are passed through adjacent conduits. The system of conduits in a diaphragm of the invention may be formed by fibers or sheets made of a substance capable of being removed from the finished diaphragm. These fibers or sheets are placed in a mold and the polymerization mixture is then poured over them. After polymerization, the insert-forming fibers or sheets are removed as by dissolution in a chemical agent which leaves the hydrogel intact.

Glass fibers are a preferred insert material, and may be removed after polymerization by means of hydrofluoric acid which does not attack the acrylic and other polymers of this invention. Any excess of hydrofluoric acid, together with the fluosilicic acid formed is washed out by water. Other suitable insert-forming materials are those which can be fused below the boiling point of water such as aliphatic polyesters melting below 100° C. and other low-melting materials such as waxes or alloys. Any residue which cannot be removed by heating is dissolved in a suitable solvent to which the hydrogel is resistant such as ethyl acetate or an acid.

The dialyzer diaphragms made in the afore-described manner are equally suitable for industrial and for medical purposes, such as artificial kidneys. Many other applications will suggest themselves to those skilled in the art.

In order to prevent leakage from one conduit to an adjacent one at points where fibers or sheets of the insert material touched each other before polymerization, we prefer to coat the fibers or sheets by immersion in a monomer solution identical with or similar to that from which the main portion of the diaphragm is to be made before the fibers or sheets are placed in the mold. This coating on the inserts is at least partially polymerized by gentle heating before the main body of the polymerization mixture is poured over them. During polymerization of the latter the newly formed polymer attaches itself to the pre-polymerized coating to form an integral body. Several layers of coating may be applied successively and at least partially polymerized to ensure against leaks. The volume ratio between channels and diaphragm body may be made particularly high when inserts coated by the described method are employed, and dialyzing apparatus of high volume efficiency may thus be produced.

An entire article prepared in the manner outlined above is held together by molecular forces, and may thus be described as a single giant molecule skeleton swelled with colloidally retained water. It is not only permeable to water and to certain substances dissolved in water, but it has substantial mechanical strength, the ability to retain its shape, and to elastically recover it after deformation. The objects made from the hydrogels of the invention may be boiled in water or aqueous solutions without deterioration, and are thus capable of being sterilized for medical purposes. They are compatible with living tissue and are excellent materials for body implants to fill or divide cavities in the body or, for objects which are to be left in contact with mucous membranes for extended periods, such as contact lenses or pessaries. Under special conditions, they may also find use in ion exchangers.

When the ratio of monomer and water is selected in such a manner that the polymerization mixture divides into two phases during a period of advanced polymerization, the excess aqueous liquid is not rejected in a continuous layer or in macroscopic bubbles. It collects in minute drops which fill microscopic pores or cavities which are distributed throughout the body of the hydrogel and its mechanical retention is enhanced by the covalent forces of the hydrophilic polymer.

Water may be partly removed from such articles by exerting pressure on them, but after the pressure is released, air cannot enter the cavities, and the overall volume of the article remains smaller until it is placed in contact with water or an aqueous solution whereupon it swells back to its original size and shape. Water is held in such an article partly by capillary attraction in the cavities, and partly as a constituent of the colloidal system of a hydrogel.

Hydrogels of the type described from which a portion of the aqueous constituent has been removed by squeezing have absorbent qualities which can be used to advantage in adherent pads or layers for dental prostheses and the like. They also are useful for ultrafiltration.

The quantity of water or of equivalent aqueous solutions colloidally held in the hydrogel is determined essentially by the amount of cross-linking agent copolymerized. If the water present during polymerization does not satisfy the holding capacity of the hydrogel, additional water or aqueous solution such as physiological saline solution may be absorbed in the hydrogel after polymerization by merely immersing the polymerizate in the aqueous liquid. An increase in cross linking decreases the maximum water content. It is the linear portion of the polymer molecules which retains water most effectively. The water acts very much like a plasticizer and the water content thus influences the mechanical properties of the gel. Its best mechanical properties are achieved at 50 to 80% water content but even gels containing as much as 97% water are shape retaining and capable of instantaneously recovering their original shape after elastic deformation of 100 percent or more. The optical properties are mainy dependent on the water content. The refractive index of the hydrogels of the invention having a water content of substantially 90% does not differ for all practical purposes from that of human hydrated tissue such as the human eye. Contact lenses made from the hydrogels of the invention are practically invisible, and remain invisible even if their surface should be accidentally damaged. They greatly differ in this respect from contact lenses made of methyl methacrylate. From such lenses they also differ by their softness which avoids mechanical eye irritation, and by their permeability to products of tissue metabolism and the like which cannot accumulate at the lens surface.

The following examples are merely illustrative of methods which may be employed to advantage to produce the hydrogels of the invention and objects made therefrom, and the invention is not to be limited to the specific embodiments disclosed.

Example I

Molds conforming to the shapes of contact lenses and of pessaries are filled with an aqueous solution containing 20% by weight of polyvinyl alcohol, 2% adipic acid, and 5% hydrogen chloride to a temperature in the range of 50 to 80° C. until the contents of the molds gel to form a clear soft hydrogel.

The lenses and pessaries formed are unmolded, thoroughly washed in running water, and then stored in a solution of a mild antibacterial agent, such as an aqueous solution of 3–5% boric acid. The boric acid diffuses into the shaped articles and is available as medication to the body tissue with which the lenses or pessaries may be brought into contact.

Example II

A mixture of polyvinyl alcohol esters of methacrylic acid is prepared by reacting 100 equivalents of the alcohol with one equivalent of methacrylic acid anhydride in a manner well known in itself. The partly esterified polyvinylalcohol is dissolved in water to form a 25% aqueous solution and polymerized in the presence of potassium persulfate and sodium thiosulfate in a flat mold to form a clear, soft body which is readily deformed by pressure but elastically recovers its shape when the pressure is released. After removal of water soluble material by thorough washing, the body produced makes a diaphragm.

Example III

An aqueous solution containing 500 parts of triethyleneglycol monomethacrylate having the formula $$CH_2{=}\underset{\underset{CH_3}{|}}{C}{-}COO{-}C_2H_4{-}O{-}C_2H_4{-}O{-}C_2H_4{-}OH$$

is mixed with a solution of one part of the corresponding dimethacrylate of the formula $$(CH_2{=}\underset{\underset{CH_3}{|}}{C}{=}COO{-}C_2H_4{-}O)_2{=}C_2H_4$$

in 300 parts of ethylene glycol. 100 parts of a 0.5% solution of potassium persulfate in water are added and the polymerization mixture is poured into a double mold of polycapronamide shaped to conform to a contact lens having a size of 78% of the desired final product.

The mold is heated to 50° C. for three hours. The polymeric body formed in the shape of a lens is washed in running water and stored in physiological saline solution in which it assumes its ultimate shape by swelling.

The lens may be stored ready for use in the saline solution or in a dilute boric acid solution for long periods.

Example IV

An aqueous 15% solution of polyacrylic acid is mixed in a mold with an equimolecular amount of an aqueous 20% solution of polyvinyl alcohol. Hydrochloric acid is added to adjust the HCl concentration to 5%. The mixture is poured into a mold conforming to a surgical implant of desired shape and heated to an elevated temperature for several hours and until a self-supporting gel-like transparent mass is formed. The molding produced is washed in water and made isotonic by immersion in physiological saline solution.

Example V

An aqueous solution is prepared from 15% (by weight) acrylamide, 10% ethylene glycol monomethacrylate, and 0.1% ethylene glycol dimethacrylate, the balance being water. One liter of this solution is mixed with 10 ml. of an aqueous 2% solution of sodium thiosulfate and 15 ml. of an aqueous 2% solution of ammonium persulfate. The resultant mixture is poured into a mold and polymerizes at room temperature. A soft, highly elastic article having the characteristic properties of a gel is obtained. It is washed in running water for several hours to remove water-soluble constituents, and is stored in a solution containing penicillin which gradually diffuses into the body of the hydrogel.

The block obtained by polymerization may be cut into suitably shaped pieces for medical purposes. The penicillin absorbed by the hydrogel will gradually be released to a tissue in contact with the hydrogel.

When the dimethacrylate content of the aforedescribed mixture is reduced to 0.01% in the starting solution, the hydrogel formed will be softer and capable of containing a larger percentage of water.

Example VI

An excess amount of ethylene oxide under pressure is forced into a 20% solution of acrylic acid in water. A mixture of polyethylene glycol monoacrylate and diacrylate is obtained. Each molecule of the polyethylene glycol constituent contains an average of 4 to 5 glycol residues. There is a very large excess of monoester over the diester.

The resulting mixture contains water and polyethylene glycol as solvents. Polymerization is initiated by addition of 0.1 gram potassium pyrosulfate and 0.5 ml. 30% hydrogen peroxide to each liter of the mixture. The polymerization takes place when the mixture is heated to moderately elevated temperature, or when it is left standing at room temperature.

A block polymer is obtained which is cut into plate or sheets to suit the intended surgical purpose. These pieces are washed in water and stored in physiological saline solution until needed.

When propylene oxide is substituted for ethylene oxide, the corresponding polypropylene glycol esters of acrylic acid are formed and polymerize into a hydrogel of substantially the same properties as those of the copolymer of mono- and diesters of polyethylene glycol with acrylic acid. In a similar manner, acrylic acid may be replaced by methacrylic acid without basic change in the process or in the results achieved.

Example VII 400 parts of polyethylene glycol methacrylate obtained by absorbing ethylene oxide under pressure in an aqueous solution of methacrylic acid are dissolved in 500 parts of water together with one part of polyethylene glycol dimethacrylate. A conventional redox catalyst, such as sodium bisulfite and ammonium persulfate, is then added and the polymerization is permitted to take place at moderately elevated temperature in a mold having the shape of a contact lens.

The polymerizate is washed in water to remove soluble materials and may be employed to replace conventional glasses.

Example VIII

An aqueous solution of polyethylene glycol monomethacrylate and polyethylene glycol dimethacrylate is prepared as in the preceding Example VII. Two bundles of differently colored continuous glass fibers are coated with a portion of the solution to which catalyst was added, and the coating is polymerized by gentle heating. The coated fibers are then placed in a mold conforming to the shape of a diaphragm and the two ends of all fibers of equal color are connected to respective inlet and outlet pipes. The fibers are partly parallel to each other, but they may intersect each other and be superimposed upon each other in any manner.

The main body of monomer solution is then mixed with the catalyst and poured into the mold where it is permitted to polymerize. The diaphragm with the embedded glass fibers is treated for several hours with hydrofluoric acid to dissolve the glass. It is then washed to remove the residual acid and the fluosilicic acid formed.

Example IX 20 part of acrylamide, 20 parts of dimethylaminoethyl methacrylate, and 0.1 part of triethanolamine dimethacrylate are dissolved in 60 parts of water and are polymerized in the presence of a redox catalyst containing sodium thiosulfate and potassium persulfate as active constituents. A block of hydrogel is obtained and is cut into small pieces which are employed as ion exchangers.

It will be apparent to those skilled in the art that hydrogels consisting essentially of a sparingly cross-linked hydrophilic polymer and 20 to 97% of water or other aqueous liquid may be prepared by following the teachings of this disclosure, but substituting other monomers for those specifically named.

Although polymers based on acrylic polymers, that is on esters of acrylic and methacrylic acid with polyfunctional alcohols are preferred because of their chemical inertness and compatibility with body tissues, hydrogels consisting of a hydrophilic polymer and an aqueous liquid may be prepared from other monomers by suitably modified methods.

One may, for example, heat alpha-beta-dihydroxy adipic acid with a small amount of an unsaturated polymerizable dicarboxylic acid such as itaconic acid and with an equimolecular amount of a glycol, such as polyethylene glycol or 1,6 - hexamethylene glycol in the absence of oxygen, dissolve the linear polyester formed in water, and induce polymerization of the aqueous solution obtained by a conventional redox catalyst.

Linear water soluble polyamides, the chain of which contains a small amount of a polymerizable dicarboxylic acid or of an unsaturated polymerizable diamine may be cross-linked by polymerization.

Materials relying for polymerization on olefinic double bonds may be replaced by reaction components with reactive groups, such as carboxyl groups, capable of condensation in an aqueous medium. The simultaneous reaction of a minor amount of a tricarboxylic acid, and a major amount of a dicarboxylic acid with a glycol, a diamine, or an amino alcohol will lead to products capable of absorbing at least some water and of performing a few, although not all, of the valuable functions of which hydrogels based on acrylic polymers are capable.

It will be evident to those skilled in the art that the polymerization reactions described do not depend on the particular chemical composition of the catalysts and catalyst mixtures described for the purpose of illustration.

It should of course be understood that the foregoing disclosure relates to only preferred embodiments of the invention and that it is intended to cover all changes and modifications of the examples of the invention herein chosen for the purpose of the disclosure which do not constitute departures from the spirit and scope of the invention set forth in the appended claims.

What we claim is:

1. A shaped body essentially consisting of a hydrogel of a sparingly cross-linked hydrophilic polymer and of 20 to 97% of an aqueous liquid, said polymer being a copolymer of a major amount of a polymerizable monoester of an olefinic acid selected from the group consisting of acrylic and methacrylic acid, said monoester having a single olefinic double bond, with a minor amount of a polymerizable diester of one of said acids, said diester having at least two olefinic double bonds, said monoesters and diesters being water soluble, said monoester having a hydrophilic functional group.

2. A body as set forth in claim 1, wherein said aqueous liquid contains a physiologically active solute.

3. A body as set forth in claim 2, wherein said solute is bacteriostatic.

4. A body as set forth in claim 1, wherein said aqueous liquid is substantially isotonic.

5. A body as set forth in claim 1, wherein at least one of said [monester] *monoester* and of said diester is an ester of a polyhydric alcohol selected from the group consisting of ethylene glycol, propylene glycol, polyethylene glycol, polypropylene glycol, and polyvinyl alcohol.

6. A body as set forth in claim 1, wherein at least one of said [monester] *monoester* and of said diester is an aminoester.

7. A body as set forth in claim 1 and being formed with a plurality of openings therethrough, said openings defining passages through said body separated from each other by said hydrogel.

8. A shape-retaining hydrogel body essentially consisting of a sparingly cross-linked hydrophilic copolymer of a water-soluble monoester of an olefinic acid and of a polyfunctional alcohol having an esterifiable hydroxyl group and at least one additional hydrophilic functional group, with a water soluble diester of an olefinic acid and of an alcohol having at least two esterifiable hydroxyl groups, said olefinic acids being selected from the group consisting of acrylic acid and methacrylic acid, and said diester being present in said copolymer in an amount not exceeding one mole percent of said monoester; and of an aqueous liquid.

9. A hydrogel body as set forth in claim 8, wherein at least one of said alcohols is a polyalkylene glycol.

10. A hydrogel body as set forth in claim 8, wherein at least one of said alcohols is polyethylene glycol.

11. A hydrogel body as set forth in claim 8, wherein at least one of said alcohols is triethylene glycol.

12. A hydrogel body as set forth in claim 8, wherein said polyfunctional alcohol is dimethylaminoethanol, and said alcohol having two hydroxyl groups is triethanolamine.

13. A hydrogel body as set forth in claim 8, wherein at least one of said alcohols is polyvinyl alcohol.

14. A hydrogel body as set forth in claim 8, wherein at least one of said alcohols is ethylene glycol.

*15. The structure defined in claim 1 in which the body is a contact lens.*

*16. The structure defined in claim 1 wherein the body is a contact lens and said aqueous liquid contains a physiologically active solute.*

*17. The structure defined in claim 1 wherein the body is a contact lens and said aqueous liquid is substantially isotonic.*

*18. The structure defined in claim 5 in which the body is a contact lens.*

*19. The structure defined in claim 1 wherein the body is a contact lens and at least one of said monoester and of said diester is an ester of a polyhydric alcohol selected from the group consisting of ethylene glycol and propylene glycol.*

*20. The structure defined in claim 8 wherein the body is a contact lens.*

*21. The structure defined in claim 8 wherein the body is a contact lens and at least one of said alcohols is ethylene glycol.*

*22. The structure defined in claim 1 wherein the body is a contact lens and both said monoester and said diester are an ester of a polyhydric alcohol selected from the group consisting of ethylene glycol and propylene glycol.*

*23. The structure defined in claim 22 wherein the polyhydric alcohol is ethylene glycol in both the monoester and the diester.*

References Cited

The following references, cited by the Examiner, are of record in the patented file of this patent or the original patent.

UNITED STATES PATENTS

| | | |
|---|---|---|
| 2,506,537 | 5/1950 | Barnes et al. |
| 2,801,984 | 8/1957 | Morgan et al. |
| 2,908,659 | 10/1959 | Shashona. |
| 2,923,692 | 2/1960 | Ackerman et al. |

MELVIN GOLDSTEIN, Primary Examiner

U.S. Cl. X.R.

3—1; 18—47; 128—127; 204—296; 210—321; 260—29.7, 29.7 H, 86.6 E; 264—49; 351—160